(12) United States Patent
Fuerst et al.

(10) Patent No.: US 10,362,501 B2
(45) Date of Patent: Jul. 23, 2019

(54) METHOD AND APPARATUS FOR MONITORING A PERFORMANCE OF AN ETHERNET DATA STREAM

(71) Applicant: ADVA Optical Networking SE, Meiningen OT Dreissigacker (DE)

(72) Inventors: Cornelius Fuerst, Fuerstenfeldbruck (DE); Wayne Sankey, Plano, TX (US)

(73) Assignee: ADVA OPTICAL NETWORKING SE, Meiningen-Dreissigacker (DE)

( * ) Notice: Subject to any disclaimer, the term of this patent is extended or adjusted under 35 U.S.C. 154(b) by 20 days.

(21) Appl. No.: 15/663,217

(22) Filed: Jul. 28, 2017

(65) Prior Publication Data
US 2018/0035319 A1 Feb. 1, 2018

(30) Foreign Application Priority Data
Aug. 1, 2016 (EP) ................................. 16182196

(51) Int. Cl.
*H04W 24/06* (2009.01)
*H04B 10/40* (2013.01)
*H04L 1/00* (2006.01)
*H04L 25/49* (2006.01)

(52) U.S. Cl.
CPC ............ *H04W 24/06* (2013.01); *H04B 10/40* (2013.01); *H04L 1/0043* (2013.01); *H04L 25/4908* (2013.01); *H04L 1/0045* (2013.01); *H04L 1/0078* (2013.01)

(58) Field of Classification Search
CPC .. H04W 24/06; H04L 25/4908; H04L 1/0043; H04L 1/0045; H04L 1/0078; H04B 10/40
See application file for complete search history.

(56) References Cited

U.S. PATENT DOCUMENTS

| 6,098,100 A | * | 8/2000 | Wey | G06F 13/385 709/223 |
| 7,055,073 B2 | * | 5/2006 | Walker | H04L 7/041 341/58 |
| 7,251,699 B1 | * | 7/2007 | Lo | H04L 12/40136 709/250 |
| 7,512,075 B1 | * | 3/2009 | Paul | H04L 43/12 370/250 |
| 7,539,489 B1 | | 5/2009 | Alexander | |
| 2007/0234172 A1 | * | 10/2007 | Chiabrera | H04L 1/0043 714/752 |

(Continued)

FOREIGN PATENT DOCUMENTS

EP 1 993 233 A1 11/2008

OTHER PUBLICATIONS

Extended European search report for European Patent Application No. 16182196.2 (dated May 9, 2017).

*Primary Examiner* — Dady Chery
(74) *Attorney, Agent, or Firm* — Jenkins, Wilson, Taylor & Hunt, P.A.

(57) ABSTRACT

An apparatus for monitoring a performance of an Ethernet data stream, EDS, said apparatus comprising: an evaluation unit adapted to evaluate sync headers and block type fields of line code vectors of the Ethernet data stream, EDS; and a counter unit adapted to increment at least one performance counter in response to the evaluated sync header and the evaluated block type field of each line code vector of the Ethernet data stream, EDS.

29 Claims, 5 Drawing Sheets

(56) References Cited

U.S. PATENT DOCUMENTS

2009/0214221 A1  8/2009 Li et al.
2012/0166760 A1* 6/2012 Wong ................... G06F 7/5055
                                                711/220

* cited by examiner

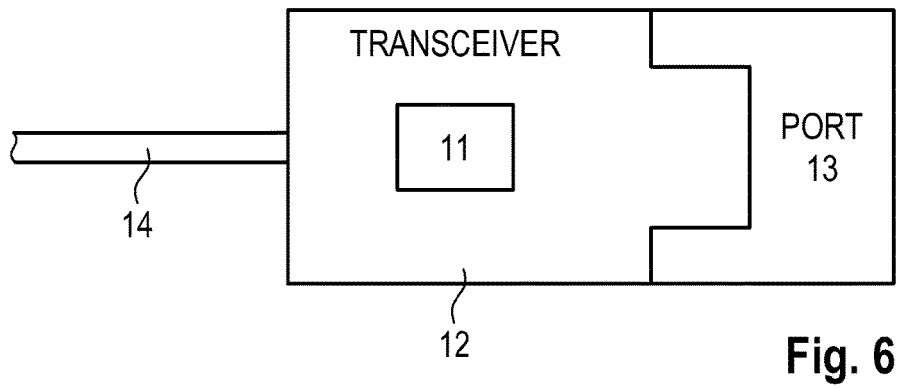

Fig. 6

| Input Data: | Sync | Block Payload | | | | | | | |
|---|---|---|---|---|---|---|---|---|---|
| Bit Position: | D 1 | 2 | | | | | | | 65 |
| Data Block Format: | | | | | | | | | |
| $C_0C_1C_2C_3C_4C_5C_6C_7$ | 01 | $D_0$ | $D_1$ | $D_2$ | $D_3$ | $D_4$ | $D_5$ | $D_6$ | $D_7$ |
| Control Block Formats: | | Type Fleid | | | | | | | |
| $C_0C_1C_2C_3C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3D_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3S_4D_5D_6D_7$ | 10 | 0x33 | $C_0$ | $C_1$ | $C_2$ | $C_3$ | | $D_5$ | $D_6$ | $D_7$ |
| $C_0C_1C_2C_3C_4C_5C_6C_7$ | 10 | 0x66 | $D_1$ | $D_2$ | $D_3$ | $O_0$ | | $D_5$ | $D_6$ | $D_7$ |
| $O_0C_1C_2C_3S_4D_5D_6D_7$ | 10 | 0x55 | $D_1$ | $D_2$ | $D_3$ | $O_0$ | $O_4$ | $D_5$ | $D_6$ | $D_7$ |
| $O_0D_1C_2C_3C_4C_5C_6C_7$ | 10 | 0x78 | $D_1$ | $D_2$ | $D_3$ | $D_4$ | | $D_5$ | $D_6$ | $D_7$ |
| $S_0D_1D_2D_3D_4D_5D_6D_7$ | 10 | 0x4b | $D_1$ | $D_2$ | $D_3$ | $O_0$ | $C_4$ | $C_5$ | $C_6$ | $C_7$ |
| $O_0D_1D_2D_3S_4C_5C_6C_7$ | 10 | 0x87 | | $C_1$ | $C_2$ | $C_3$ | $C_4$ | $C_5$ | $C_6$ | $C_7$ |
| $T_0C_1C_2C_3C_4C_5C_6C_7$ | 10 | 0x99 | $D_0$ | | $C_2$ | $C_3$ | $C_4$ | $C_5$ | $C_6$ | $C_7$ |
| $D_0T_1C_2C_3C_4C_5C_6C_7$ | 10 | 0xaa | $D_0$ | $D_1$ | | $C_3$ | $C_4$ | $C_5$ | $C_6$ | $C_7$ |
| $D_0D_1D_2T_3C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3D_4T_5C_6C_7$ | 10 | 0xd2 | $D_0$ | $D_1$ | $D_2$ | $D_3$ | $D_4$ | | $C_6$ | $C_7$ |
| $D_0D_1D_2D_3S_4D_5T_6C_7$ | 10 | 0xe1 | $D_0$ | $D_1$ | $D_2$ | $D_3$ | $D_4$ | | $D_6$ | $C_7$ |
| $D_0D_1D_2C_3C_4C_5C_{6/7}$ | 10 | 0xtt | $D_0$ | $D_1$ | $D_2$ | $D_3$ | $D_4$ | $D_5$ | $D_6$ |

Fig. 7

| Sync | Block Type Field | 66b Block Counter Increment | Data Octet Counter Increment | Frame Counter Increment | Frame Size Counter |
|---|---|---|---|---|---|
| 00 | - | 1 | 0 | 0 | |
| 11 | - | 1 | 0 | 0 | |
| 01 | - | 1 | 8 | 0 | |
| 10 | 0x1E | 1 | 0 | 0 | |
| 10 | 0x2D | 1 | 3 | 0 | |
| 10 | 0x33 | 1 | 4 | 1 | |
| 10 | 0x66 | 1 | 7 | 1 | |
| 10 | 0x55 | 1 | 6 | 0 | |
| 10 | 0x78 | 1 | 8 | 1 | |
| 10 | 0x4B | 1 | 3 | 0 | |
| 10 | 0x87 | 1 | 0 | 0 | |
| 10 | 0x99 | 1 | 1 | 0 | |
| 10 | 0xAA | 1 | 2 | 0 | |
| 10 | 0xB4 | 1 | 3 | 0 | |
| 10 | 0xCC | 1 | 4 | 0 | |
| 10 | 0xD2 | 1 | 5 | 0 | |
| 10 | 0xE1 | 1 | 6 | 0 | |
| 10 | 0xFF | 1 | 7 | 0 | |

Fig. 8

- Data vector (Syncheader=0b01)

Sync header      64 bits of data

- Data vector (Syncheader=0b10)

Sync header      56 bits of data

METHOD AND APPARATUS FOR MONITORING A PERFORMANCE OF AN ETHERNET DATA STREAM

PRIORITY CLAIM

This application claims the benefit of European Patent Application No. 16182196.2, filed Aug. 1, 2016, the disclosure of which is incorporated herein by reference in its entirety.

FIELD OF THE INVENTION

The invention relates to a method and apparatus for monitoring a performance of an Ethernet data stream, in particular in a dense wavelength division multiplexed network.

TECHNICAL BACKGROUND

In a conventional network, counters can be used to monitor the network. By monitoring the network, it is possible to manage SLAs to perform troubleshooting or to enable preemptive actions within the network. In a conventional network, monitoring is performed by using counters implemented in the MAC layer. However, implementation of a MAC layer requires significant chip resources, in particular power supply and chip area.

Accordingly, it is an object of the present invention to provide a method and apparatus for monitoring a performance of an Ethernet data stream for devices without any MAC layer implementation.

SUMMARY OF THE INVENTION

The invention provides according to a first aspect an apparatus for monitoring a performance of an Ethernet data stream said apparatus comprising:
an evaluation unit adapted to evaluate sync headers and block type fields of line code vectors of the Ethernet data stream and
a counter unit adapted to increment at least one performance counter in response to the evaluated sync header and the evaluated block type field of each line code vector of the Ethernet data stream.

In a possible embodiment of the apparatus according to the first aspect of the present invention, the apparatus is adapted to monitor the performance of the Ethernet data stream non-intrusively.

In a further possible embodiment of the apparatus according to the first aspect of the present invention, the at least one performance counter of said counter unit is incremented by an increment value read by said counter unit from a look-up table stored in a memory unit of said apparatus.

In a further possible embodiment of the apparatus according to the first aspect of the present invention, the look-up table stored in the memory unit of the apparatus comprises for the sync header and the block type field of each line code vector of the used line code a corresponding increment value for each performance counter of said counter unit.

In a further possible embodiment of the apparatus according to the first aspect of the present invention, the line code vectors of the Ethernet data stream comprise n1b/n2b line code vectors encoded by an encoding scheme where data words having n1 bits are transformed to line code vectors having n2 bits by coding bit blocks and adding redundancy.

In a still further possible embodiment of the apparatus according to the first aspect of the present invention, the sync header of the line code vector indicates whether the line code vector is a data vector or a control vector.

In a further possible embodiment of the apparatus according to the first aspect of the present invention, the line code vector comprises 64b/66b line code vectors.

In a further possible embodiment of the apparatus according to the first aspect of the present invention, the line code vectors comprise 8b/10b line code vectors.

In a possible embodiment of the apparatus according to the first aspect of the present invention, the at least one performance counter of said counter unit comprises
a n2b-block counter adapted to count the number of received line code vectors having an admissible sync header within the Ethernet data stream and/or
a data octet counter adapted to count the number of data octets within the line code vectors of the Ethernet data stream and/or
a frame counter adapted to count the number of frames within the Ethernet data stream and/or
a frame-size counter adapted to count the frame size of each frame within the Ethernet data stream.

In a possible embodiment of the apparatus according to the first aspect of the present invention, the counter value of the at least one performance counter of said counter unit is written to a corresponding register and reset in response to an interrupt signal.

In a possible embodiment of the apparatus according to the first aspect of the present invention, the interrupt signal is generated by an interrupt unit periodically.

In a further possible embodiment of the apparatus according to the first aspect of the present invention, the apparatus further comprises a performance processing unit adapted to process the counter values of the performance counters of said counter unit to calculate performance parameters of the monitored Ethernet data stream.

In a further possible embodiment of the apparatus according to the first aspect of the present invention, the performance processing unit is adapted to calculate at least one utilization performance parameter of the monitored Ethernet data stream depending on counter values of performance counters of said counter unit.

In a further possible embodiment of the apparatus according to the first aspect of the present invention, the utilization performance parameter of the Ethernet data stream is calculated by said performance processing unit of said apparatus as follows:

$$UP = \frac{OCV + (12 * FCV)}{BCV * 8} * 100\%,$$

wherein
UP is the utilization performance parameter,
OCV is the octet counter value of a data octet counter of said counter unit,
FCV is the frame counter value of a frame counter of said counter unit, and
BCV is a block counter value of a n2b-block counter of said counter unit.

In a possible embodiment of the apparatus according to the first aspect of the present invention the performance processing unit comprises an FPGA circuit.

In a further possible embodiment of the apparatus according to the first aspect of the present invention, the performance processing unit is further adapted to calculate a binning distribution of the Ethernet data stream depending on a frame size counter value of a frame size counter of said counter unit.

In a still further possible embodiment of the apparatus according to the first aspect of the present invention, the apparatus further comprises a reporting data interface adapted to output the counter values of the performance counters of said counter unit and/or the performance parameters calculated by the processing unit of said apparatus to a network management unit of a network.

In a still further possible embodiment of the apparatus according to the first aspect of the present invention, the apparatus further comprises an input interface adapted to receive the Ethernet data stream via a data link from a first subnetwork and an output interface adapted to forward the Ethernet data stream via a data link to a second subnetwork.

In a still further possible embodiment of the apparatus according to the first aspect of the present invention, the network management unit is adapted to control the first subnetwork connected to the input interface of the apparatus and/or the second subnetwork connected to an output interface of the apparatus in response to the received counter values and/or in response to the calculated performance parameters.

In a possible embodiment of the apparatus according to the first aspect of the present invention, the subnetworks comprise WDM networks.

In a still further possible embodiment of the apparatus according to the first aspect of the present invention, the apparatus is integrated into a pluggable transceiver device adapted to be plugged into a port.

In a possible embodiment of the apparatus according to the first aspect of the present invention, the pluggable transceiver device comprises a SFP.

In a further possible embodiment of the apparatus according to the first aspect of the present invention, the pluggable transceiver device comprises a QSFP.

In a further possible embodiment of the apparatus according to the first aspect of the present invention, the apparatus is integrated in a gearbox device.

In a further possible embodiment of the apparatus according to the first aspect of the present invention, the gearbox device is a multilane gearbox device.

In a further possible embodiment of the apparatus according to the first aspect of the present invention, the apparatus is integrated in an optical transceiver network device.

The invention further provides according to a second aspect a method for monitoring a performance of an Ethernet data stream, the method comprising the steps of:
evaluating sync headers and block type fields of line code vectors of the Ethernet data stream and
incrementing at least one performance counter in response to the evaluated sync header and the evaluated block type field of each line code vector of the Ethernet data stream.

In a possible embodiment of the method according to the second aspect of the present invention, the performance counter is formed by a physical coding sublayer counter counting at a PCS layer of the employed Ethernet network protocol of the Ethernet data stream.

In a further possible embodiment of the method according to the second aspect of the present invention, the line code vectors of the Ethernet data stream comprise n1b/n2b line code vectors encoded by an encoding scheme where data words having n1 bits are transformed to line code vectors having n2 bits by coding bit blocks and adding redundancy.

In a possible embodiment of the method according to the second aspect of the present invention, the line code vectors comprise 64b/66b line code vectors.

In a further possible embodiment of the method according to the second aspect of the present invention, the line code vectors comprise 8b/10b line code vectors.

In a possible embodiment of the method according to the second aspect of the present invention, performance parameters of the monitored Ethernet data stream are calculated depending on counter values of the performance counters.

The invention further provides according to a third aspect a gearbox device comprising
a monitoring apparatus for monitoring a performance of an Ethernet data stream,
said monitoring apparatus comprising:
an evaluation unit adapted to evaluate sync headers and block type fields of line code vectors of the Ethernet data stream, EDS; and
a counter unit adapted to increment at least one performance counter in response to the evaluated sync header of the evaluated block type field of each line code vector of the Ethernet data stream.

The invention further provides according to a fourth aspect a pluggable transceiver device adapted to be plugged into a port of a network node,
said pluggable transceiver device comprising a monitoring apparatus for monitoring a performance of an Ethernet data stream,
said monitoring apparatus comprising:
an evaluation unit adapted to evaluate sync headers and block type fields of line code vectors of the Ethernet data stream and
a counter unit adapted to increment at least one performance counter in response to the evaluated sync header and the evaluated block type field of each line code vector of the Ethernet data stream.

The invention further provides according to a fifth aspect an optical transport network device comprising a monitoring apparatus for monitoring a performance of an Ethernet data stream,
said monitoring apparatus comprising:
an evaluation unit adapted to evaluate sync headers and block type fields of line code vectors of the Ethernet data stream and
a counter unit adapted to increment at least one performance counter in response to the evaluated sync header and the evaluated block type field of each line code vector of the Ethernet data stream.

The invention further provides according to a sixth aspect a dense wavelength division multiplexed network comprising at least one monitoring apparatus for monitoring a performance of an Ethernet data stream,
said monitoring apparatus comprising:
an evaluation unit adapted to evaluate sync headers and block type fields of line code vectors of the Ethernet data stream and
a counter unit adapted to increment at least one performance counter in response to the evaluated sync header and the evaluated block type field of each line code vector of the Ethernet data stream.

BRIEF DESCRIPTION OF FIGURES

In the following, possible embodiments of the different aspects of the present invention are described in more detail with reference to the enclosed figures.

FIG. 6 shows schematically a pluggable transceiver according to a further aspect of the present invention comprising a gearbox device as shown in FIG. 5;

FIG. 7 shows a table for illustrating a possible implementation of an apparatus and of a method for monitoring a performance of an Ethernet data stream according to an aspect of the present invention;

FIG. 8 shows an exemplary look-up table specific for 646/666 coding which can be used by the apparatus and method for monitoring a performance of an Ethernet data stream in a possible embodiment;

DETAILED DESCRIPTION OF EMBODIMENTS

Figure 1:
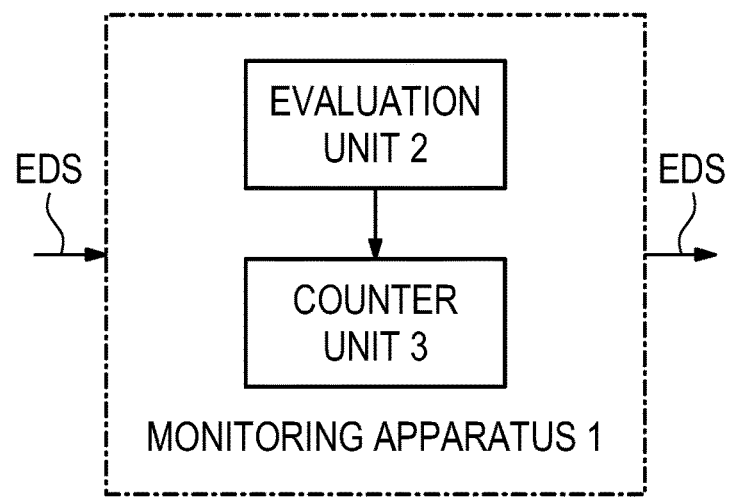
FIG. 1 shows a block diagram of a possible exemplary embodiment of an apparatus for monitoring a performance of an Ethernet data stream according to the first aspect of the present invention.

As can be seen in FIG. 1, the monitoring apparatus 1 for monitoring a performance of an Ethernet data stream EDS can comprise in the illustrated embodiment an evaluation unit 2 and a counter unit 3. The evaluation unit 2 is adapted to evaluate sync headers and block type fields of line code vectors LCVs of the monitored Ethernet data stream EDS. The counter unit 3 of the monitoring apparatus 1 is adapted to increment at least one performance counter in response to the evaluated sync header and the evaluated block type field of each line code vector of the monitored Ethernet data stream EDS. The monitoring apparatus 1 according to the first aspect of the present invention as illustrated in FIG. 1 is adapted to monitor the performance of the Ethernet data stream EDS non-intrusively. In a possible embodiment, the at least one performance counter of the counter unit 3 can be incremented by an increment value read by the counter unit 3 from a look-up table LUT stored in a memory unit of the monitoring apparatus 1.

Figure 2:
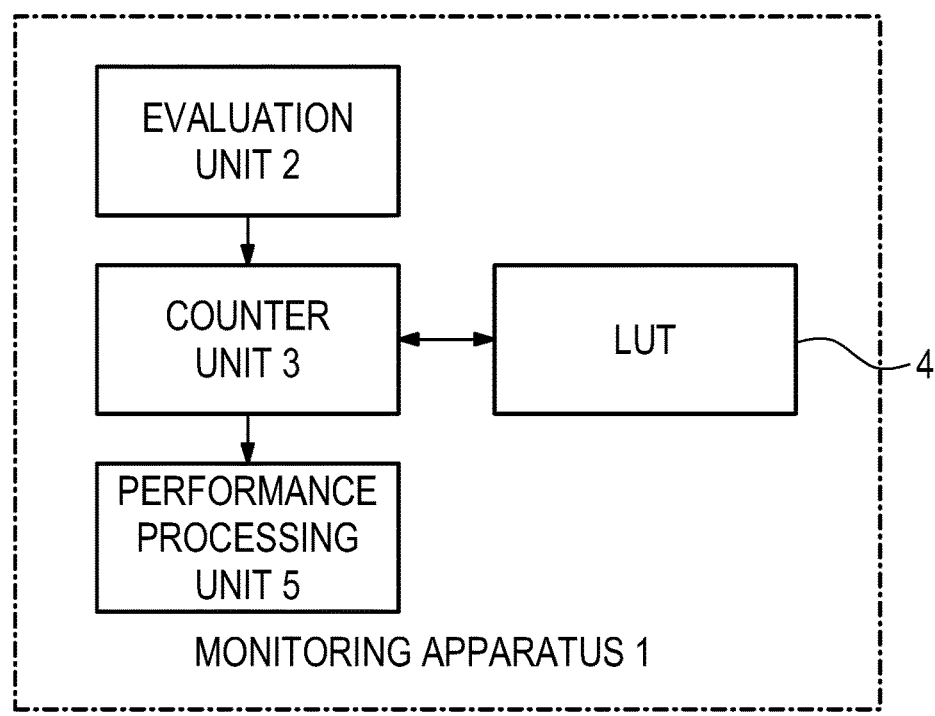
FIG. 2 shows a further block diagram of a possible exemplary embodiment of an apparatus for monitoring a performance of an Ethernet data stream according to the first aspect of the present invention.

FIG. 2 shows a possible embodiment of a monitoring apparatus 1 according to the first aspect of the present invention comprising a memory unit 4 storing at least one look-up table LUT. In a possible embodiment, at least one performance counter of the counter unit 3 is incremented by an increment value read by the counter unit 3 from the look-up table LUT stored in the memory unit 4 of the monitoring apparatus 1. The look-up table LUT stored in the memory unit 4 of the apparatus 1 comprises for the sync header and the block type field of each line code vector of the used line code a corresponding increment value for each performance counter of the counter unit 3.

Figure 9A:
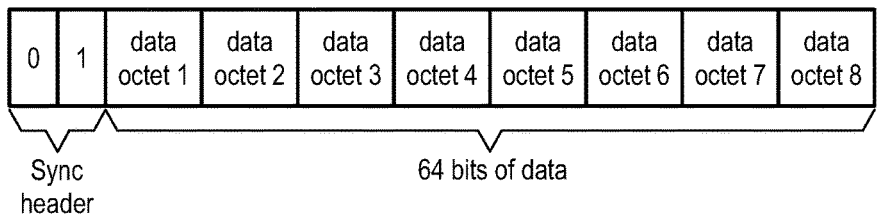
FIGS. 9A, 9B illustrate the data structure of a data vector and a control vector within an Ethernet data stream.
Figure 9B:
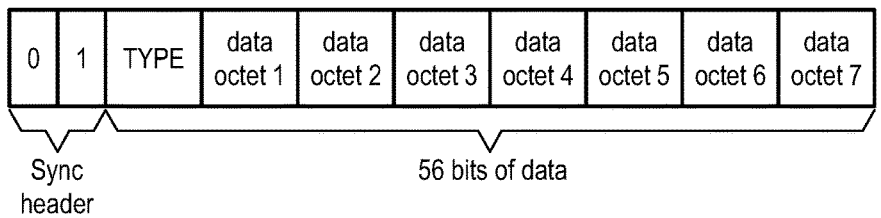

In a possible embodiment, the line code vectors LCVs of the Ethernet data stream EDS can comprise n1b/n2b line code vectors encoded by an encoding scheme where data words having n1 bits are transformed to line code vectors having n2 bits by coding bit blocks and adding redundancy. The sync header of the line code vector LCV indicates whether the line code vector is a data vector or a control vector. FIG. 9A shows a data structure of an exemplary data vector having a specific sync header. FIG. 9B shows a data structure of an exemplary control vector having a corresponding specific sync header. The sync header of the line code vector indicates whether the line code is a data vector or a control vector. The control vector comprises a type field which indicates the type of the control vector and its internal data structure. There are different available types of control vectors. Start/s/ indicates the start of a data packet. It occurs only on positions 0 to 4 within an aggregated 64 bit vector received from XGMII. Receipt of /s/ on any other lane indicates an error.

Terminate /T/ indicates the end of a data packet. It occurs on any position or octet within an aggregated 64-bit vector received from XGMII. It is necessary that /T/ is followed by /S/ (start) or /I/ (idle).

Error/E/ indicates an error within the data stream. It can occur on any position within an aggregated 64-bit vector received from XGMII. It can be used to relay error indication across XGMII and then onto a link peer station.

Ordered set /Q/ is used to send control and status information such as remote fault and local fault status across the link to a link peer station. It consists of a control character and three data characters. Ordered set /Q/ does always begin on the first octet of the XGMII transfer vector. It may be deleted or inserted by PCS (Physical Coding Sublayer) to control adaption between clock rates. A deletion only occurs when two consecutive ordered sets are received and only one of the two is deleted.

FIG. 7 shows 64b/66b block formats including the data block format and different control block formats. Accordingly, in a possible embodiment, line code vectors LCVs of the Ethernet data stream EDS can comprise 64b/66b line code vectors as illustrated in FIG. 7. In an alternative embodiment, the line code vectors of the Ethernet data stream EDS can also comprise 8b/10b line code vectors.

The counter unit 3 of the monitoring apparatus 1 can comprise at least one performance counter. In a possible embodiment, the counter unit 3 comprises several performance counters. In a possible implementation, the counting unit 3 comprises a n2b-block counter adapted to count the number BCV of received line code vectors having an admissible sync header within the Ethernet data stream EDS. In a further possible embodiment, the counter unit 3 can also comprise a data octet counter adapted to count the number OCV of data octets within the line code vectors of the Ethernet data stream EDS. In a further possible implementation, the counter unit 3 can comprise a frame counter adapted to count the number FCV of frames within the Ethernet data stream EDS. In a further possible embodiment, the counter unit 3 of the monitoring apparatus 1 can further comprise a frame size counter adapted to count the frame size SCV of each frame within the monitored Ethernet data stream EDS. The counter value of the at least one performance counter within the counter unit 3 can be written to a corresponding register. In a possible embodiment, the counter value written to the register can be reset in response to an interrupt signal generated by an interrupt unit of the monitoring apparatus 1. In a possible embodiment, the interrupt signal is generated by the interrupt unit periodically.

FIG. 8 illustrates an exemplary implementation of a look-up table LUT stored in the memory unit 4 of the monitoring apparatus 1 used by the counter unit 3 for incrementing its implemented performance counters. The look-up table LUT comprises four different block type fields corresponding to counter increment values for the different performance counters. In the illustrated implementation, the sync header having the value 10 indicates the control vector having a block type field. Depending on the block type field, different counter increment values for the different performance counters of the counter unit 3 are stored in the loop-up table LUT as shown in FIG. 8. For example, if the block type field comprises the value 0x1E, the n2b block counter is incremented by 1 whereas the data octet counter and the frame counter are not incremented. If the block type field and the control vector is for instance 0x2D, the n2b block counter is incremented by 1 and the data octet counter is incremented by 3 whereas the frame counter is not incremented as illustrated in the table of FIG. 8. In a possible embodiment, the monitoring apparatus 1 first evaluates the header of the received line code vector by reading its sync header and by reading its block type field. Depending on the read block type, the performance counters within the control unit 3 are incremented according to the increment values stored in the look-up table LUT. This is continued until an interrupt signal, for instance by a timer or interrupt unit, is received. Then, the counter values are written into a separate register for further processing and then reset to zero for a new counting cycle.

In the embodiment illustrated in FIG. 2, the monitoring apparatus 1 further comprises a performance processing unit 5 which has access to the counter values stored in the corresponding counter registers of the counter unit 3. The performance processing unit 5 is adapted to process the counter values of the performance counters to calculate performance parameters of the monitored Ethernet data stream EDS. The performance processing unit 5 of the monitoring apparatus 1 is adapted to calculate at least one utilization performance parameter of the monitored Ethernet data stream EDS depending on the counter values read from the registers of the performance counters within the counter unit 3.

In a possible implementation, a utilization performance parameter UP of the Ethernet data stream EDS is calculated by the performance processing unit 5 as follows:

$$UP = \frac{OCV + (12 * FCV)}{BCV * 8} * 100\%,$$

wherein
OCV is the octet counter value of a data octet counter of the counter unit 3,
FCV is the frame counter value of the frame counter of the counter unit 3, and
BCV is the block counter value of a n2b-block counter of the counter unit 3.

In a possible embodiment, the performance processing unit 5 is further adapted to calculate at least one binning distribution of the monitored Ethernet data stream EDS depending on the frame size counter value SCV of the frame size counter of the counter unit 3.

Figure 10:
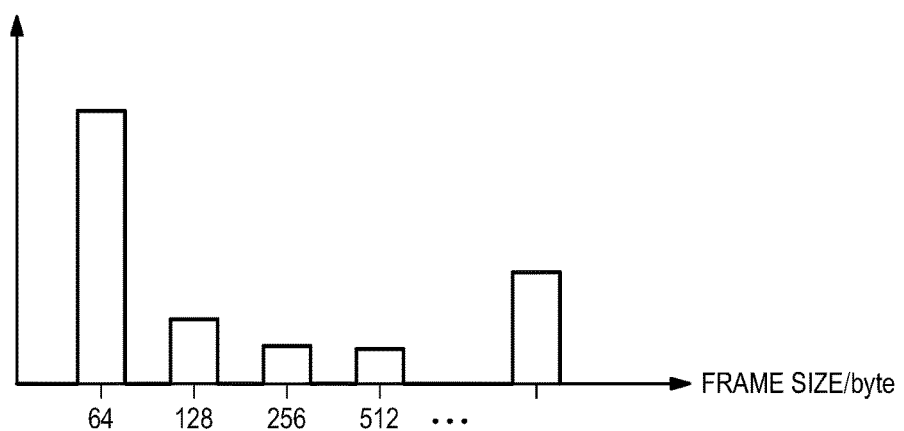
FIG. 10 shows a diagram for illustrating exemplary binning distribution which can be calculated by the monitoring apparatus according to the first aspect of the present invention.

FIG. 10 illustrates an exemplary binning distribution calculated by the performance processing unit 5. The distribution illustrates the frequency of a frame size. In a possible embodiment, the binning distribution can be further evaluated to detect or estimate the kind of data transported within the Ethernet data stream EDS. If there is a high frequency of Ethernet frames having a huge bit frame size this can indicate a video data stream. The frame size has an impact on the performance of the network. With a small frame size, the overhead within the data transport increases thus reducing the data transport performance. In a possible embodiment, the monitoring apparatus 1 as shown in FIG. 2 comprises a reporting data interface. The reporting data interface is adapted to output the counter values of the performance counters implemented in the counter unit 3 of the monitoring apparatus 1. In a possible embodiment, the reporting data interface of the monitoring apparatus 1 is further adapted to output the performance parameters calculated by the performance processing unit 5 of the monitoring apparatus 1. In a possible embodiment, the reporting data interface is connected to an external network management NMU unit of a network.

Figure 3:
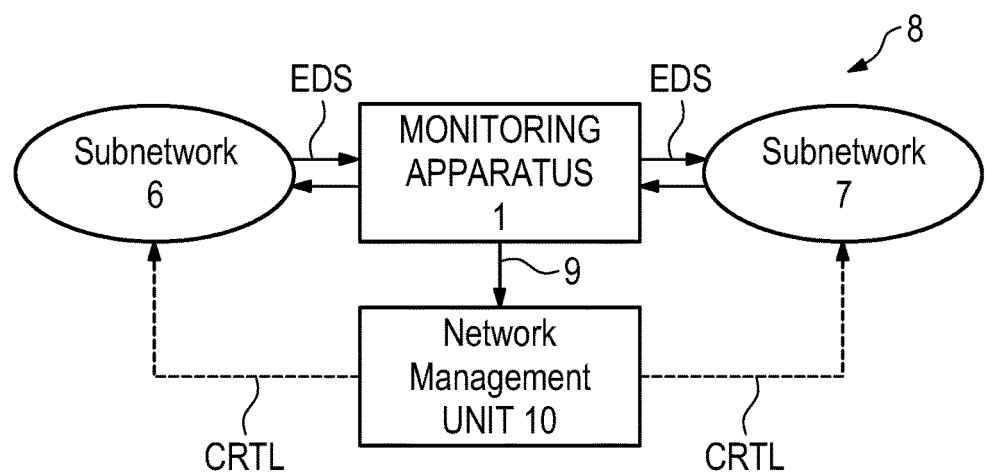
FIG. 3 shows a diagram for illustrating schematically a network using the monitoring apparatus according to the first aspect of the present invention.

The performance processing unit 5 is adapted to calculate performance parameters indicating a utilization of the network. In a possible embodiment, the performance processing unit 5 can comprise a microprocessor or a programmable FPGA. In an alternative embodiment, the performance processing unit can also be implemented by an ASIC. FIG. 3 illustrates schematically a possible embodiment of a network employing a monitoring apparatus 1 according to the first aspect of the present invention. In the illustrated embodiment, the monitoring apparatus 1 is interconnected between two subnetworks 6, 7 of the network 8 for monitoring non-intrusively and without delay the Ethernet data stream EDS in one direction or in both directions. In the illustrated schematic network 8, the Ethernet data stream EDS is transmitted from the first subnetwork 6 to the second subnetwork 7 via the monitoring apparatus 1. The monitoring apparatus 1 comprises an input interface adapted to receive the Ethernet data stream EDS via a first data link from the first subnetwork 6. The monitoring apparatus 1 further comprises an output interface adapted to forward the received Ethernet data stream EDS via a second data link to the second subnetwork 7. The apparatus 1 further comprises in the illustrated embodiment a reporting data interface adapted to output the counter values of the performance counters of the counter unit 3 and/or the performance parameters calculated by the performance processing unit 5 of the monitoring apparatus 1 via a data link 9 to the network management unit 10 of the network 8. In a possible embodiment, the network management unit 10 is adapted to control the first subnetwork 6 connected to the input interface of the monitoring apparatus 1 and/or the second subnetwork 7 connected to the output interface of the monitoring apparatus 1 in response to the received counter values and/or in response to the calculated performance parameters as illustrated in FIG. 3. The subnetworks 6, 7 of the network 8 can comprise WDM networks. The first subnetwork 6 can be for instance a subnetwork of a service provider whereas the second subnetwork 7 can be the network of a client of said service provider. The network management unit 10 receives via the reporting interface 9 Ethernet statistics of the Ethernet data streams EDS flowing between the two subnetworks 6, 7 provided by the performance processing unit 5 and/or counter values provided by the counter unit 3 of the monitoring apparatus 1. In a possible embodiment, the network management unit 10 can use the received performance parameters or statistics values and/or the received counter values to monitor whether a service level agreement SLA is fulfilled by a service provider. The received parameters and counter values can be used by the network management unit 10 for further processing, for instance for calculating billing data.

Figure 4:
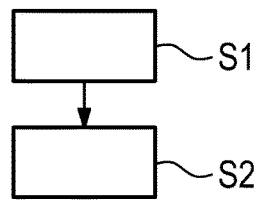
FIG. 4 shows a flowchart of a possible exemplary embodiment of a method for monitoring a performance of an Ethernet data stream according to a further aspect of the present invention.

FIG. 4 shows a flowchart of a possible exemplary embodiment of a method for monitoring a performance of an Ethernet data stream EDS according to a further aspect of the present invention. The method comprises in the illustrated implementation two steps.

In a first step S1, sync headers and block type fields of line code vectors LCVs of the monitored Ethernet data stream EDS are evaluated.

In a further step S2, at least one performance counter is incremented in response to the evaluated sync header and the evaluated block type field of each line code vector of the monitored Ethernet data stream EDS.

In a possible implementation, the performance counter is formed by a physical coding sublayer, PCS, counter counting at a PCS layer of the employed Ethernet network protocol of the Ethernet data stream EDS. The line code vectors of the monitored Ethernet data stream EDS evaluated in step S1 can comprise n1b/n2b line code vectors which are encoded by an encoding scheme where data words having n1 bits are transformed to line code vectors having n2 bits by coding bit blocks and adding redundancy. The line code vectors can comprise in a possible implementation 64b/66b line code vectors. Line code vectors can comprise in an alternative embodiment 8b/10b line code vectors. In a further possible embodiment of the method as illustrated in FIG. 4, in a further step, performance parameters of the monitored Ethernet data stream EDS are calculated depending on the counter values of the performance counters.

Figure 5:
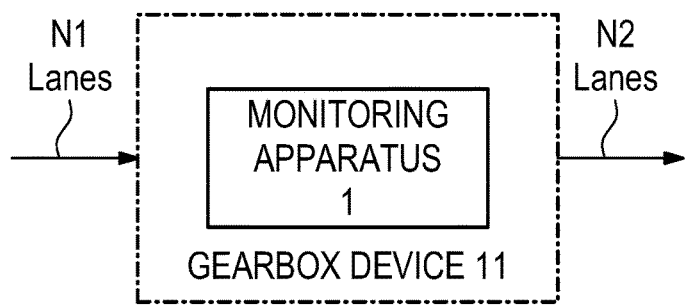
FIG. 5 shows schematically a gearbox device according to a further aspect of the present invention comprising a monitoring apparatus according to the first aspect of the present invention.

FIG. 5 shows schematically in a block diagram a gearbox device 11 according to a further aspect of the present invention comprising a monitoring apparatus 1 according to the first aspect of the present invention. The gearbox device 11 receives on the input side N1 lanes and outputs on the output side N2 lanes. The gearbox device 11 comprises an integrated monitoring apparatus 1 according to the first aspect of the present invention adapted to monitor a performance of the Ethernet data streams. Possible implementations of the monitoring apparatus 1 integrated in the gearbox device 11 are shown in the block diagrams of FIGS. 1, 2.

FIG. 6 shows schematically a pluggable transceiver device 12 comprising at least one integrated gearbox device 11 as shown in FIG. 5. The pluggable transceiver device 12 is adapted to be plugged into a port 13 of a network node. The pluggable transceiver 12 is connected to an optical fiber 14 transporting the Ethernet data stream EDS. The pluggable transceiver device 12 comprises the monitoring apparatus 1 for monitoring the performance of the transported Ethernet data stream wherein the monitoring apparatus 1 has an evaluation unit 2 adapted to evaluate sync headers and block type fields of line code vectors of the transported Ethernet data stream and a counter unit 3 adapted to increment at least one performance counter in response to the evaluated sync header and the evaluated block type field of each line code vector of the transported Ethernet data stream EDS. In the illustrated embodiment of FIG. 6, the pluggable transceiver 12 comprises a gearbox device 11 as shown in FIG. 5. In a possible embodiment, the gearbox device 11 is a multilane gearbox device MLG. The pluggable transceiver 12 as shown in FIG. 6 can comprise in a possible embodiment a SFP (Small Form Factor) device. In a further possible embodiment, the pluggable transceiver 12 can comprise a QSFP (Quad SFP (four lanes)).

In a further possible embodiment of the monitoring apparatus 1 according to the first aspect of the present invention, the monitoring apparatus 1 can be integrated in an optical transceiver network, OTN, device. The invention provides according to a further aspect an optical transport network, OTN, device comprising a monitoring apparatus 1 adapted to monitor a performance of an Ethernet data stream. Possible embodiments of the integrated monitoring apparatus 1 are illustrated in FIGS. 1, 2.

The invention provides according to a further aspect a dense wavelength division multiplexed, DWDM, network comprising at least one monitoring apparatus 1 according to the first aspect of the present invention. The dense wavelength division multiplexed network can comprise several subnetworks such as illustrated in FIG. 3. The monitoring apparatus 1 can be integrated in different devices, in particular into a gearbox device, a MLG or an OTW chip. It can be used for monitoring different kinds of Ethernet data streams, in particular 10GE, 40GE, 100GE. The monitoring apparatus 1 according to the first aspect of the present invention provides a multilane (e.g. 40GE) support without need of a deskew function. The monitoring apparatus 1 can also be used for other data rates comprising e.g. 5G, 25G, 100G, 400G. The monitoring apparatus 1 according to the first aspect of the present invention can also be integrated into a pluggable transceiver device, in particular SFP and QSFP. The monitoring apparatus 1 allows to provide Ethernet statistics having only PCS layer data. The monitoring apparatus 1 according to the first aspect of the present invention does not need any MAC layer implementation. This reduces circuit complexity and saves power. The monitoring apparatus 1 enables performance monitoring of any kind of Ethernet data stream using circuits which have only a PCS layer functionality. The monitoring apparatus 1 according to a possible embodiment can also derive a utilization monitoring without using counters of a MAC layer but counters at the PCS layer. This can be performed by counting PCS layer codes such as 64-bit codes and octets depending on the PCS layer sync header of the codes. The method and apparatus according to the present invention allow an Ethernet utilization monitoring on client ports on devices that do not have a MAC layer functionality but comprise only a PCS layer access.

The invention claimed is:

1. An apparatus for monitoring a performance of an Ethernet data stream, EDS, said apparatus comprising:
   an evaluation unit configured to evaluate sync headers and block type fields of line code vectors of the Ethernet data stream, EDS; and
   a counter unit configured to increment at least one performance counter in response to the evaluated sync header and the evaluated block type field of each line code vector of the Ethernet data stream, EDS, wherein the at least one performance counter of said counter unit is incremented by an increment value read by said counter unit from a look-up table, LUT, stored in a memory unit of said apparatus.

2. The apparatus according to claim 1, wherein the apparatus is configured to monitor the performance of the Ethernet data stream, EDS, non-intrusively.

3. The apparatus according to claim 1, wherein said look-up table, LUT, stored in the memory unit of the apparatus comprises, for the sync header and the block type field of each line code vector of each line code used by the Ethernet data stream, EDS, a corresponding increment value for each performance counter of said counter unit.

4. The apparatus according to claim 1, wherein the line code vectors of the Ethernet data stream, EDS, comprise n1b/n2b line code vectors encoded by an encoding scheme where data words having n1 bits are transformed to line code vectors having n2 bits by coding bit blocks and adding redundancy.

5. The apparatus according to claim 4, wherein the sync header of the line code vector indicates whether the line code vector is a data vector or a control vector.

6. The apparatus according to claim 5, wherein the line code vectors comprise 64b/66b line code vectors, or wherein the line code vectors comprise 8b/10b line code vectors.

7. The apparatus according to claim 1, wherein the at least one performance counter of said counter unit comprises:
an n2b-block counter configured to count the number (BCV) of received line code vectors having an admissible sync header within the Ethernet data stream, EDS; and/or
a data octet counter configured to count the number (OCV) of data octets within the line code vectors of the Ethernet data stream, EDS; and/or
a frame counter configured to count the number (FCV) of frames within the Ethernet data stream, EDS; and/or
a frame-size counter configured to count the frame size (SCV) of each frame within the Ethernet data stream, EDS.

8. The apparatus according to claim 1, wherein a counter value of the at least one performance counter of said counter unit is written to a corresponding register and reset in response to an interrupt signal.

9. The apparatus according to claim 8, wherein the interrupt signal is generated periodically by an interrupt unit.

10. The apparatus according to claim 1 further comprising a performance processing unit configured to process counter values of the at least one performance counter of said counter unit to calculate performance parameters of the monitored Ethernet data stream, EDS.

11. The apparatus according to claim 10, wherein the performance processing unit is configured to calculate at least one utilization performance parameter of the monitored Ethernet data stream, EDS, depending on the counter values of the at least one performance counter of said counter unit.

12. The apparatus according to claim 11, wherein the at least one utilization performance parameter, UP, of the Ethernet data stream, EDS, is calculated by said performance processing unit of said apparatus as follows:

$$UP=(OCV+(12*FCV))/(BCV*8)*100\%,$$

wherein
OCV is the octet counter value of a data octet counter of said counter unit,
FCV is the frame counter value of a frame counter of said counter unit, and
BCV is a block counter value of an n2b-block counter of said counter unit.

13. The apparatus according to claim 10, wherein said performance processing unit is further configured to calculate a binning distribution of the Ethernet data stream, EDS, depending on a frame size counter value, SCV, of a frame size counter of said counter unit.

14. The apparatus according to claim 10, wherein said performance processing unit comprises a programmable FPGA circuit.

15. The apparatus according to claim 1, wherein said apparatus is configured to monitor different kinds of Ethernet data streams comprising 5G, 10G, 25G, 50G, 100G, 400G Ethernet data streams.

16. The apparatus according to claim 1 comprising a reporting data interface configured to output counter values of the at least one performance counter of said counter unit and/or the performance parameters calculated by a performance processing unit of said apparatus to a network management unit of a network.

17. The apparatus according to claim 16, wherein the apparatus comprises an input interface configured to receive the Ethernet data stream, EDS, via a data link from a first subnetwork and an output interface configured to forward the Ethernet data stream, EDS, via a data link to a second subnetwork.

18. The apparatus according to claim 17, wherein the network management unit is configured to control the first subnetwork connected to the input interface of the apparatus and/or the second subnetwork connected to the output interface of the apparatus in response to the counter values and/or in response to the calculated performance parameters.

19. The apparatus according to claim 18, wherein the subnetworks comprise WDM networks.

20. The apparatus according to claim 1, wherein the apparatus is integrated into a pluggable transceiver device configured to be plugged into a port,
wherein the pluggable transceiver device comprises an SFP or a QSFP, or wherein the apparatus is integrated in a gearbox device,
wherein the gearbox device comprises a multilane gearbox device, MLG, or
wherein the apparatus is integrated in an optical transceiver network, OTN, device.

21. A method for monitoring a performance of an Ethernet data stream, EDS, the method being performed by a monitoring apparatus including an evaluation unit and a counter unit including at least one performance counter, the method comprising the steps of:
evaluating, by said evaluation unit, sync headers and block type fields of line code vectors of the Ethernet data stream, EDS; and
incrementing the at least one performance counter of said counter unit in response to the evaluated sync header and the evaluated block type field of each line code vector of the Ethernet data stream, EDS, wherein the at least one performance counter of said counter unit is incremented by an increment value read by said counter unit from a look-up table, LUT, stored in a memory unit of said apparatus.

22. The method according to claim 21, wherein the at least one performance counter is formed by a physical coding sublayer, PCS, counter counting at a PCS layer of an Ethernet network protocol of the Ethernet data stream, EDS.

23. The method according to claim 21, wherein the line code vectors of the Ethernet data stream, EDS, comprise n1b/n2b line code vectors encoded by an encoding scheme where data words having n1 bits are transformed to line code vectors having n2 bits by coding bit blocks and adding redundancy.

24. The method according to claim 23, wherein the line code vectors comprise 64b/66b line code vectors or 8b/10b line code vectors.

25. The method according to claim 21, wherein performance parameters of the monitored Ethernet data stream, EDS, are calculated depending on counter values of the at least one performance counter.

26. A gearbox device comprising
a monitoring apparatus for monitoring a performance of an Ethernet data stream, EDS, said monitoring apparatus comprising:

an evaluation unit configured to evaluate sync headers and block type fields of line code vectors of the Ethernet data stream, EDS; and a counter unit configured to increment at least one performance counter in response to the evaluated sync header of the evaluated block type field of each line code vector of the Ethernet data stream, EDS, wherein the at least one performance counter of said counter unit is incremented by an increment value read by said counter unit from a look-up table, LUT, stored in a memory unit of said apparatus.

27. A pluggable transceiver device configured to be plugged into a port of a network node, said pluggable transceiver device comprising a monitoring apparatus for monitoring a performance of an Ethernet data stream, EDS, said monitoring apparatus comprising:

an evaluation unit configured to evaluate sync headers and block type fields of line code vectors of the Ethernet data stream, EDS; and a counter unit configured to increment at least one performance counter in response to the evaluated sync header and the evaluated block type field of each line code vector of the Ethernet data stream, EDS, wherein the at least one performance counter of said counter unit is incremented by an increment value read by said counter unit from a look-up table, LUT, stored in a memory unit of said apparatus.

28. An optical transport network, OTN, device comprising a monitoring apparatus for monitoring a performance of an Ethernet data stream, EDS, said monitoring apparatus comprising:

an evaluation unit configured to evaluate sync headers and block type fields of line code vectors of the Ethernet data stream, EDS; and a counter unit configured to increment at least one performance counter in response to the evaluated sync header and the evaluated block type field of each line code vector of the Ethernet data stream, EDS, wherein the at least one performance counter of said counter unit is incremented by an increment value read by said counter unit from a look-up table, LUT, stored in a memory unit of said apparatus.

29. A dense wavelength division multiplexed, DWDM, network comprising at least one monitoring apparatus for monitoring a performance of an Ethernet data stream, EDS, said monitoring apparatus comprising:

an evaluation unit configured to evaluate sync headers and block type fields of line code vectors of the Ethernet data stream, EDS; and a counter unit configured to increment at least one performance counter in response to the evaluated sync header and the evaluated block type field of each line code vector of the Ethernet data stream, EDS, wherein the at least one performance counter of said counter unit is incremented by an increment value read by said counter unit from a look-up table, LUT, stored in a memory unit of said apparatus.

* * * * *